United States Patent [19]

Watson et al.

[11] Patent Number: 4,529,497
[45] Date of Patent: Jul. 16, 1985

[54] DISPOSAL OF SPENT OIL SHALE AND OTHER MATERIALS

[75] Inventors: George H. Watson, Naperville, Ill.; David B. McWhorter, Fort Collins; Adrian Brown, Littleton, both of Colo.

[73] Assignee: Standard Oil Company (Indiana), Chicago, Ill.

[21] Appl. No.: 593,712

[22] Filed: Mar. 26, 1984

[51] Int. Cl.³ .............................. B09B 1/00; C10G 1/00
[52] U.S. Cl. .................................... 208/11 R; 405/128
[58] Field of Search ............. 208/11 R; 405/53, 128, 405/129, 229, 270; 210/170, 747, 901; 34/38

[56] References Cited

U.S. PATENT DOCUMENTS

| | | | |
|---|---|---|---|
| 3,459,003 | 8/1969 | O'Neal | 405/128 |
| 3,466,873 | 9/1969 | Present | 405/128 |
| 4,030,307 | 6/1977 | Avedisian | 405/270 |
| 4,171,921 | 10/1979 | Morfeldt | 405/128 |
| 4,247,220 | 1/1981 | Furman | 405/53 |
| 4,376,033 | 3/1983 | Calderon | 208/11 R |
| 4,384,614 | 5/1983 | Justheim | 208/11 R |

FOREIGN PATENT DOCUMENTS 55-68934  5/1980  Japan.
58-33618  2/1983  Japan.

Primary Examiner—D. E. Gantz
Assistant Examiner—Glenn A. Caldarola
Attorney, Agent, or Firm—Thomas W. Tolpin; William T. McClain; William H. Magidson

[57] ABSTRACT

A process is provided for retorting synthetic fuels, such as oil shale, and disposing of the tailings in an environmentally acceptable manner. In the process, raw synthetic fuels are retorted in a surface retort to produce synthetic oil. The synthetic oil is dedusted and upgraded. The retorted synthetic fuels can be combusted and moisturized to generate heat for the retort, produce steam, and facilitate handling of the residual waste material (tailings). A disposal site of spent synthetic fuels, spent upgrading catalyst, dust, and/or other material is formed with vapor breaks at one or more levels in the pile. Air is passed through the vapor breaks to evaporate leachate rather than permitting the leachate to carry pollutants from the pile into the ground and surrounding bodies of water.

32 Claims, 4 Drawing Figures

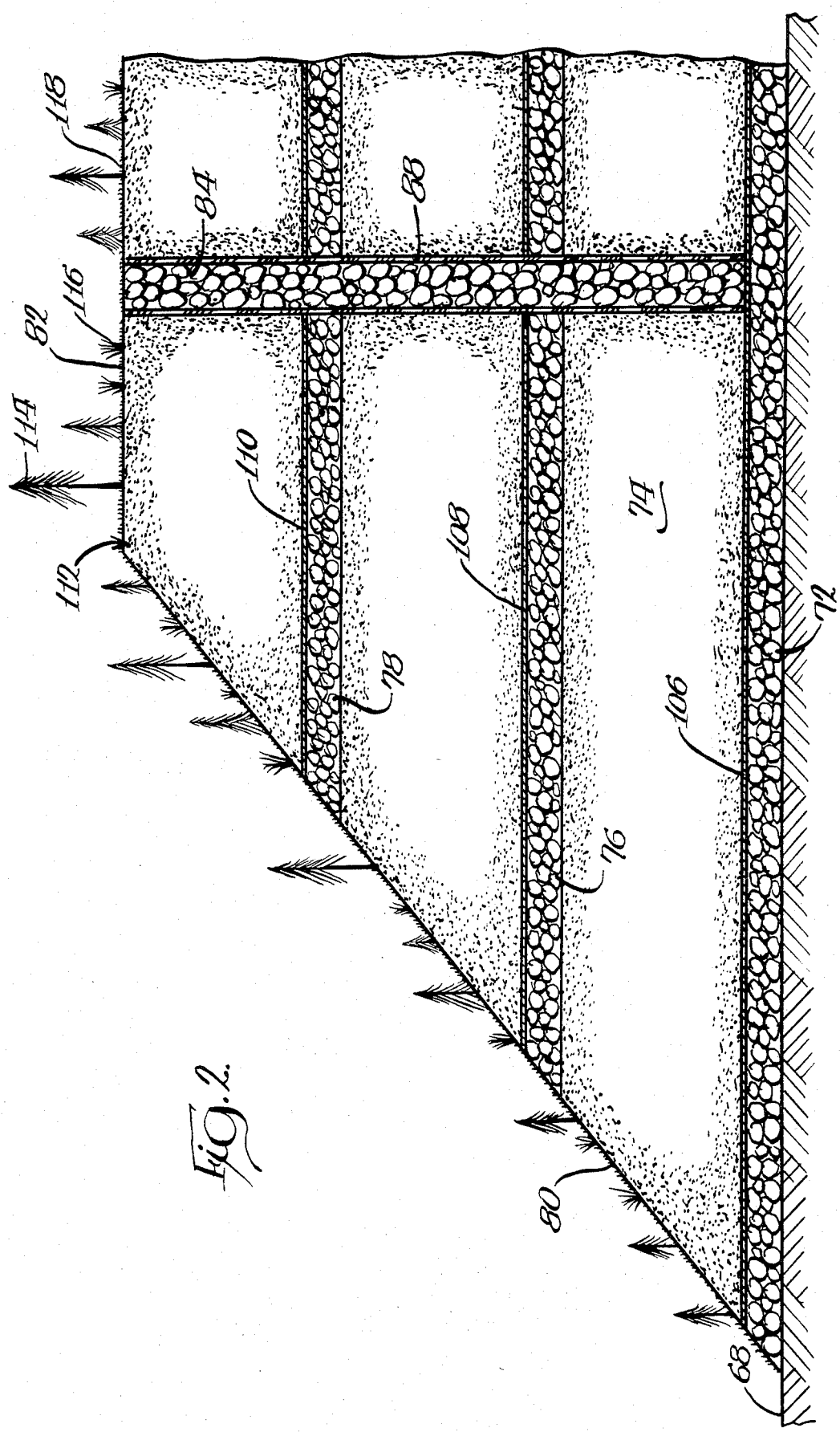

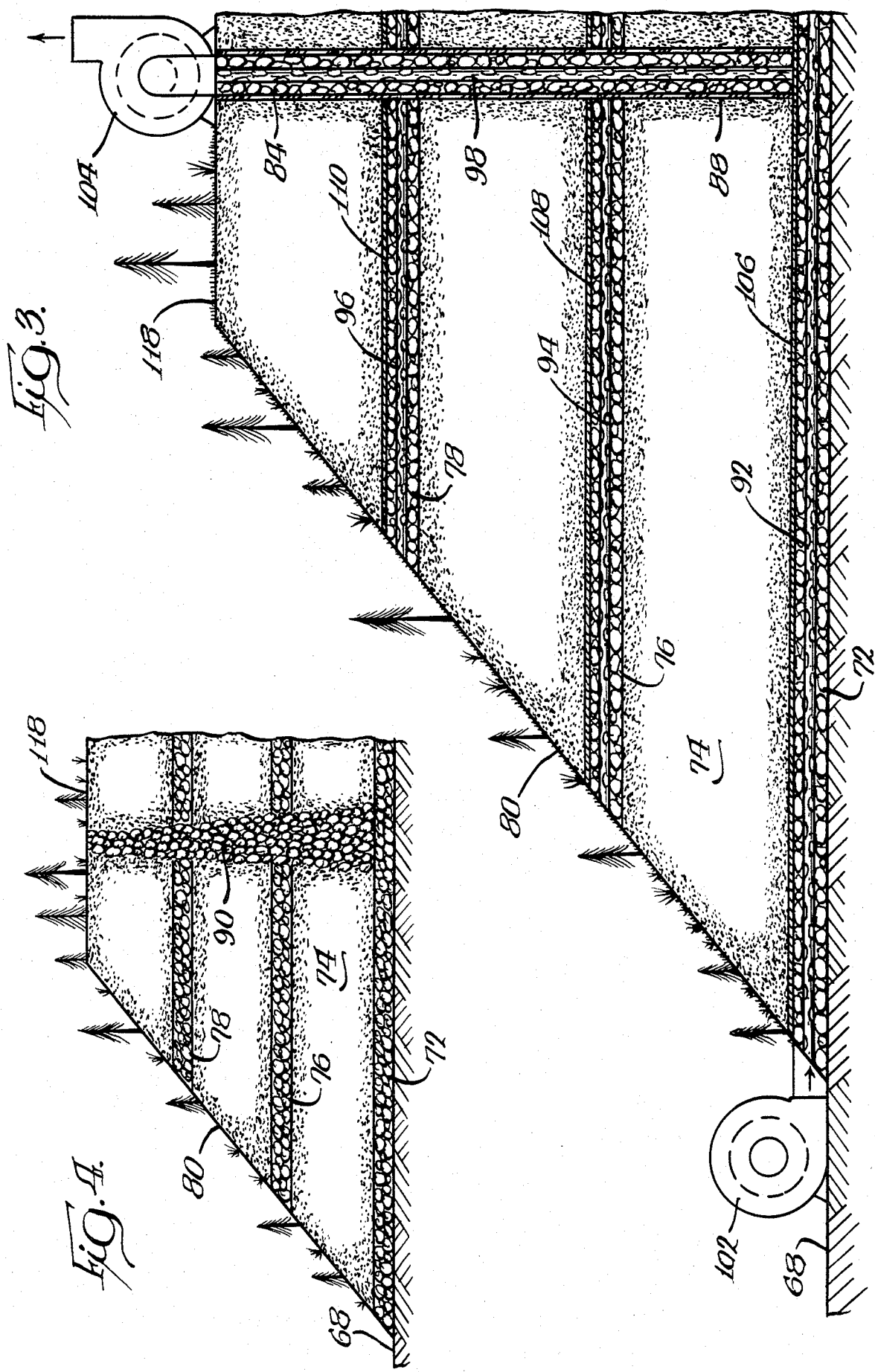

DISPOSAL OF SPENT OIL SHALE AND OTHER MATERIALS

BACKGROUND OF THE INVENTION

This invention relates to oil shale, and more particularly, to a surface retorting and disposal process.

Researchers have now renewed their efforts to find alternate sources of energy and hydrocarbons in view of past rapid increases in the price of crude oil and natural gas. Much research has been focused on recovering hydrocarbons from solid hydrocarbon-containing material such as oil shale, coal and tar sands by pyrolysis or upon gasification to convert the solid hydrocarbon-containing material into more readily usable gaseous and liquid hydrocarbons.

Vast natural deposits of oil shale found in the United States and elsewhere contain appreciable quantities of organic matter known as "kerogen" which decomposes upon pyrolysis or distillation to yield oil, gases and residual carbon. It has been estimated that an equivalent of 7 trillion barrels of oil are contained in oil shale deposits in the United States with almost sixty percent located in the rich Green River oil shale deposits of Colorado, Utah and Wyoming. The remainder is contained in the leaner Devonian-Mississippian black shale deposits which underlie most of the eastern part of the United States.

As a result of dwindling supplies of petroleum and natural gas, extensive efforts have been directed to develop retorting processes which will economically produce shale oil on a commercial basis from these vast resources.

Generally, oil shale is a fine-grained sedimentary rock stratified in horizontal layers with a variable richness of kerogen content. Kerogen has limited solubility in ordinary solvents and therefore cannot be recovered by extraction. Upon heating oil shale to a sufficient temperature, the kerogen is thermally decomposed to liberate vapors, mist, and liquid droplets of shale oil and light hydrocarbon gases such as methane, ethane, ethene, propane and propene, as well as other products such as hydrogen, nitrogen, carbon dioxide, carbon monoxide, ammonia, steam and hydrogen sulfide. A carbon residue typically remains on the retorted shale.

Shale oil is not a naturally occurring product, but is formed by the pyrolysis of kerogen in the oil shale. Crude shale oil, sometimes referred to as "retort oil," is the liquid oil product recovered from the liberated effluent of an oil shale retort. Synthetic crude oil (syncrude) is the upgraded oil product resulting from the hydrogenation of crude shale oil.

In surface retorting, oil shale is mined from the ground, brought to the surface, crushed and placed in vessels where it is contacted with a hot solid heat carrier material, such as hot spent shale, ceramic balls, metal balls, or sand or a gaseous heat carrier material, such as light hydrocarbon gases, for heat transfer. The resulting high temperatures cause shale oil to be liberated from the oil shale leaving a retorted, inorganic material and carbonaceous material such as coke. The carbonaceous material can be burned by contact with oxygen at oxidation temperatures to recover heat and to form a spent oil shale relatively free of carbon. Spent oil shale which has been depleted in carbonaceous material is removed from the retort and recycled as heat carrier material or discarded. The combustion gases are dedusted in cyclones, electrostatic precipitators, or other gas-solid separation systems.

During retorting, voluminous amounts of retorted oil shale and retort water are produced which create significant processing and disposal problems. Retorted oil shale and retort water contain numerous impurities (pollutants). For example, the impurities in combusted shale include silicon, aluminum, calcium oxides, and various sulfates. The impurities in non-combusted retorted shale include numerous organic and inorganic compounds and various oxides. The impurities (contaminants) in retort water include shale oil, carbonates, phenol, soluble organic carbon, ammonia, and oil shale particulates. Furthermore, retort water, as well as combusted and retorted shale, often contain various trace metals and materials, such as cyanide, arsenic, etc., which in sizeable quantities can be detrimental and hazardous to the safety and health of animal and plant life in nearby bodies of water and the surrounding environment. The above impurities must be prevented from leaching into the ground and polluting underground aquifers and nearby rivers, streams, and ponds. While some of the retorted shale can be used for backfilling spent modified-in-situ underground retorts or to produce cement for roadways or the like, and some of the contaminated retort water can be recycled for other uses in the process, sizeable quantities of retorted oil shale and retort water still must be treated and/or disposed of in an environmentally acceptable manner.

Over the years, various methods have been suggested for controlling leaching and seepage at disposal sites. These methods typically include a waterproof impermeable barrier or liner made of metal, cement, plastic, or asphalt. Typifying these methods and various methods to process spent shale are described in U.S. Pat. Nos. 2,592,468; 2,904,445; 3,108,441; 3,135,618; 3,394,551; 3,405,528; 3,405,529; 3,459,003; 3,625,010; 4,047,387; 4,096,912; 4,120,355; 4,131,416; 4,154,549; 4,198,097; 4,231,617; 4,315,656; 4,320,994; 4,375,985; 4,377,465; and 4,415,365. These prior art methods have met with varying degrees of success.

It is therefore desirable to provide a process which overcomes many, if not most, of the above problems.

SUMMARY OF THE INVENTION

An improved disposal process is provided which prevents contaminants from leaching through a pile of spent oil shale or other waste material into the ground and polluting underground aquifers and nearby rivers, ponds, lakes, and streams. Advantageously, the process protects the environment and helps maintain the safety, health, and general well-being of surrounding plants and animals.

In the novel process, water seeping, draining, and/or accumulating in the pile (disposal site) from rainfall, snow meltage, retort water, spent shale moisturizing, contaminated process water, etc., is evaporated to prevent the water from carrying pollutants from the waste material (tailings) into the ground and nearby bodies of water. Elimination of water in the pile as a liquid carrier prevents leaching, leakage, and transport of contaminants from the pile and promotes longevity of the disposal site. Such benefits can have far-reaching advantages for the synthetic fuels and waste disposal industries.

In order to construct an environmentally acceptable disposal site in accordance with this invention, a pile of spent oil shale or other waste material is formed with one or more pneumatic vapor-enhancing means or vapor breaks extending through the pile. Air is then circulated through the vapor enhancers or breaks to vaporize water in the pile. The vapor enhancers or breaks (barriers) can extend horizontally or laterally across the pile. The vapor enhancers or breaks can also extend upwardly or at an angle of inclination through the pile, and/or beneath or along the pile.

The vapor enhancers or breaks preferably include a porous base layer of rocks, such as rocky overburden from surrounding areas, to support and elevate the pile above the ground. The vapor enhancers or breaks can also include one or more columns, chimneys, or upright stacks of rocks extending upwardly through the pile, and/or foraminous tubing, conduits, and/or perforated pipes extending through the pile. The vapor enhancers or breaks are permeable and provide air flow openings or passageways for circulation of air, such as from the surrounding wind or air currents, through the pile.

Circulation of air can be enhanced with one or more air blowers, pumps, compressors, and/or fans. In the preferred process, dry air or air having relatively low humidity is circulated through the vapor enhancers. Circulation of air through the pile, as well as the differences between the high humidity within the pile and the low humidity outside of the pile, will result in water (leachate) in the pile evaporating into the atmosphere rather than flowing into the ground and polluting water supplies.

Desirably, the pile of waste material is covered with top soil and vegetated with trees and other plant life to help prevent erosion, as well as to beautify the disposal site. The permeable base and/or intermediate layers (vapor enhancers) can be covered with a filter to minimize plugging and silting of the vapor break. The filter can be woven cloth, felted cloth, sand, and/or gravel.

The waste material in the pile can be obtained from various processes, such as retorting, combustion, moisturization/heat recovery, extraction, etc. The waste material is also referred to as "tailings," "residue," or "residual material." The waste material can include spent catalysts which were used for upgrading synthetic oil, petroleum, and/or petrochemical feedstocks. In the preferred process, the waste material is produced by retorting or extracting synthetic fuels, such as oil shale, tar sands, and diatomite. The waste material can also be produced by extracting metals, such as copper, molybdenum, gold, or silver, or minerals, such as talc, calcium carbonate, chlorite, kaolin, and other clays, from ore, such as by smelting, froth flotation, solvent extraction, etc.

As used in this application, the term "process water" means water and/or condensed water vapor (steam) which has been obtained from the processing of synthetic fuels or ore.

The term "retort water" means water and/or condensed water vapor (steam) which has been liberated during the retorting and/or moisturization of synthetic fuels.

The terms "synthetic fuels" and "solid hydrocarbon-containing material" as used herein mean oil shale, tar sands, and oil-containing diatomaceous earth (diatomite).

The terms "retorted oil shale," "retorted hydrocarbon-containing material," and "retorted synthetic fuels" as used herein refer to oil shale, solid hydrocarbon-containing material, and synthetic fuels, respectively, which have been retorted to liberate hydrocarbons leaving an inorganic material containing carbon residue.

The terms "spent oil shale," "spent hydrocarbon-containing material," and "spent synthetic fuels" as used herein mean oil shale, solid hydrocarbon-containing material, and synthetic fuels, respectively, from which most of the carbon residue has been removed by combustion.

The term "spent catalyst" as used herein means a catalyst which has been used to increase the reaction rate in upgrading a feedstock, such as synthetic oil. Spent catalyst can be regenerated in a combustor, but sometimes, it may be desirable to avoid combusting spent catalyst for environmental reasons in order to avoid polluting the atmosphere.

The term "synthetic oil" as used herein means oil which has been produced from oil shale, solid hydrocarbon-containing material, or synthetic fuels.

The term "syncrude" as used herein means dedusted synthetic oil which has been upgraded in one or more reactors.

The term "dust" as used herein means particulates derived from oil shale, solid hydrocarbon-containing material, or synthetic fuels. The particulates range in size from less than 1 micron to 1,000 microns and include retorted and raw unretorted particles of oil shale, solid hydrocarbon-containing material, or synthetic fuels, respectively, as well as of spent oil shale, solid hydrocarbon-containing material, or synthetic fuels, respectively, or sand, if the latter is used as solid heat carrier material during retorting. Dust derived from retorting of oil shale consists primarily of clays, calcium, magnesium oxides, carbonates, silicates, and silicas. Dust derived from the retorting or extraction of tar sands consists primarily of silicates, silicas, and carbonates.

The terms "dust-laden" or "dusty" synthetic oil as used herein mean synthetic oil which contains a substantial amount of dust.

The term "dedusted" synthetic oil as used herein means synthetic oil from which a substantial amount of the dust has been removed in one or more dedusters or solid-liquid separation devices.

The terms "normally liquid," "normally gaseous," "condensible," "condensed," or "noncondensable" are relative to the condition of the subject material at a temperature of 77° F. (25° C.) at atmospheric pressure.

A more detailed explanation of the invention is provided in the following description and appended claims taken in conjunction with the accompanying drawings.

BRIEF DESCRIPTION OF THE DRAWINGS

FIG. 2 is an enlarged fragmentary cross-sectional view of the disposal site;

FIG. 3 is an enlarged cross-sectional view of the disposal site with some modifications; and FIG. 4 is an enlarged cross-sectional view of the disposal site with other modifications.

DETAILED DESCRIPTION OF THE PREFERRED EMBODIMENTS

Figure 1:
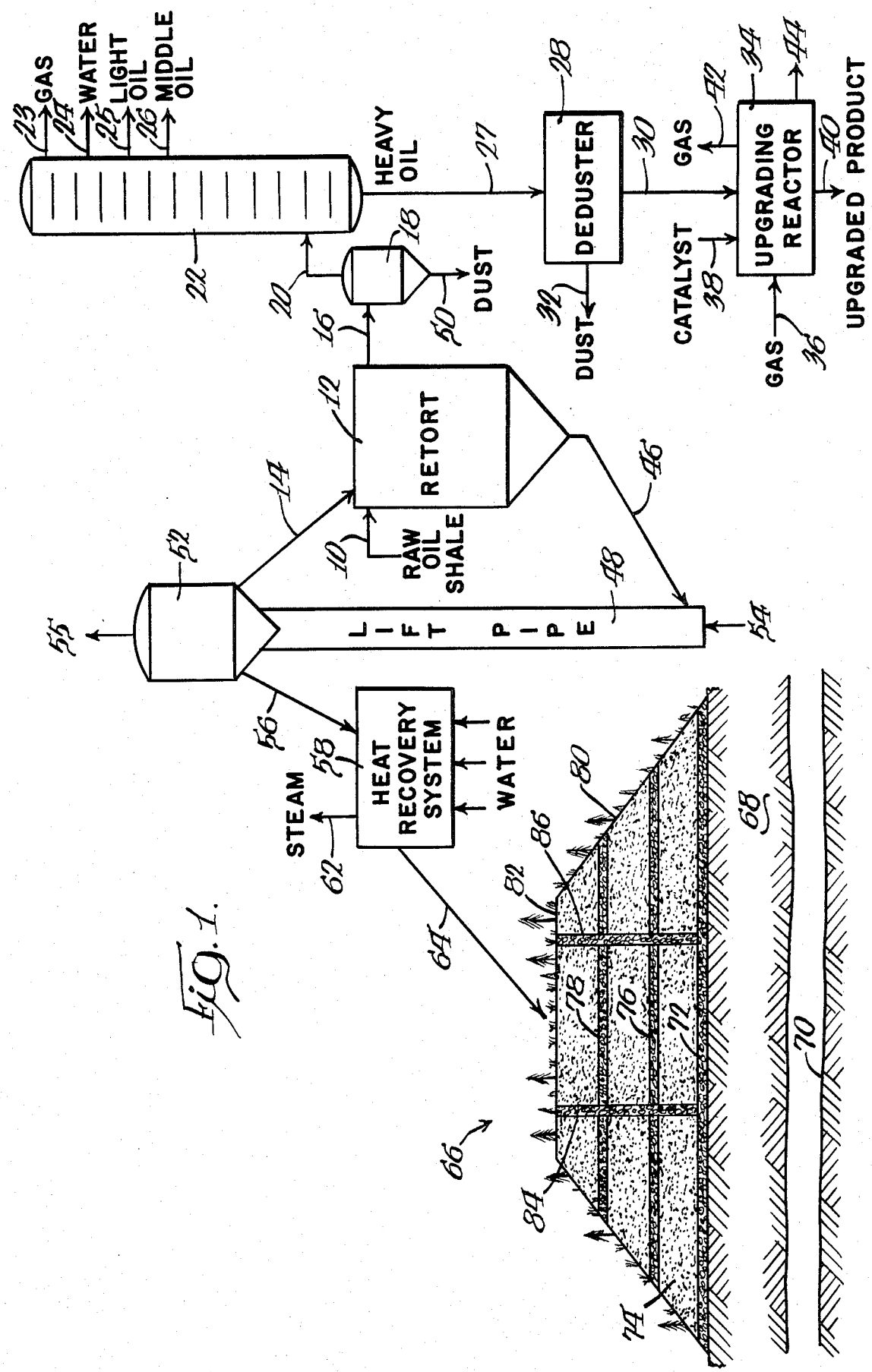
FIG. 1 is a schematic flow diagram of a retorting and disposal process in accordance with principles of the present invention.

Referring now to FIG. 1, a retorting and disposal process and system is provided to produce, dedust, and upgrade synthetic oil from solid hydrocarbon-containing material, such as oil shale, tar sands, and oil-containing diatomaceous earth (diatomite), as well as to properly dispose of residual waste material (tailings), such as retort water, dust, catalysts, and excess spent hydrocarbon-containing material produced in the process and system, in an environmentally acceptable manner. While the present invention is described hereinafter with particular reference to the processing of oil shale, it will be apparent that the process and system can be used in connection with the processing of other hydrocarbon-containing materials, such as tar sands and oil-containing diatomaceous earth. Furthermore, it will also be apparent that the present process and system can also be used in connection with the proper disposal of excess waste material (tailings) produced from the processing of metal or mineral ores, as well as for the disposal of spent catalyst used in upgrading petrochemical feedstocks, petroleum (crude), and fractions thereof.

In the process and system, raw, fresh oil shale which preferably contains an oil yield of at least 15 gallons per ton of oil shale particles, is crushed and sized to a maximum fluidizable size of 10 mm and fed through a raw shale inlet line 10 at a temperature from ambient temperature to 600° F. into an aboveground surface retort 12. The retort can be a gravity flow retort, a static mixer retort with a surge bin, a fluid bed retort, a rotating pyrolysis drum retort with an accumulator having a rotating trommel screen, or a screw conveyor retort with a surge bin. The fresh oil shale can be crushed by conventional crushing equipment, such as an impact crusher, jaw crusher, gyratory crusher, roll crusher, and screened with conventional screen equipment, such as shaker screen or a vibrating screen.

Spent (combusted) oil shale, which provides solid heat carrier material, is fed through a heat carrier line 14 at a temperature from 1,000° F. to 1,400° F., preferably from 1,200° F. to 1,300° F., into the retort to mix with, heat, and retort the raw oil shale in the retort. The retorting temperature of the retort is from 850° F. to 1,000° F., preferably from 900° F. to 960° F., near atmospheric pressure. Air and molecular oxygen are prevented from entering the retort in order to prevent combustion of oil shale, shale oil, and liberated gases in the retort.

In an fluid (fluidized) bed retort, fluidizing lift gases, such as light hydrocarbon gases, are injected into the bottom of the retort through a gas injector to fluidize, entrain, and enhance mixing of the raw oil shale and solid heat carrier material in the retort. Other types of retorts, such as a fixed bed retort, a rock pump retort, or a rotating or reciprocating grate retort, can be used with a gaseous heat carrier material in lieu of solid heat carrier material.

During retorting, hydrocarbons, gases, and water are liberated from the raw oil shale as a gas, vapor, mist, or liquid droplets and most likely a mixture thereof, along with entrained particulates of oil shale (dust) ranging in size from less than 1 micron to 1,000 microns. The effluent product stream of hydrocarbons, gases, and water liberated during retorting is withdrawn from the upper portion of the retort through a product line 16.

The product stream is passed through the product line 16 to one or more internal or external gas-solid separation devices, such as a cyclone 18 or a filter. The gas-solid separating device partially dedusts the effluent product stream. The partially dedusted stream exits the cyclone through a transport line 20 where it is transported to one or more separators 22, such as quench towers, scrubbers, or fractionators, also referred to as fractionating columns or distillation columns.

In the separator 22, the effluent product stream is separated into fractions of hydrocarbon-rich gases, water or steam, light shale oil, middle shale oil, and heavy shale oil. These fractions are discharged from the separator through lines 23–27, respectively. Heavy shale oil has a boiling point over 600° F. to 800° F. Middle shale oil has a boiling point over 400° F. to 500° F. and light shale oil has a boiling point over 100° F. If desired, a fraction of whole shale oil can be discharged from the bottom of the separator instead of fractions of light, middle, and heavy shale oil. Whole shale oil comprises heavy shale oil, middle shale oil, and light shale oil.

The solids bottom heavy shale oil fraction in the bottom separator line 27 is a slurry of dust-laden heavy shale oil that contains from 15% to 45% by weight of the effluent product stream. The dust-laden heavy oil, which is also referred to as "dusty oil," consists essentially of a normally liquid heavy shale oil and from 1% to 65% by weight entrained particulates of oil shale dust, preferably at least 25% by weight oil shale dust for reasons of dedusting efficiency and economy. Whole shale oil contains from 1% to 15%, typically from 10% by weight entrained particulates of oil shale dust. Oil shale dust is mainly minute particles of spent oil shale and lesser amounts of retorted and/or raw oil shale particulates. The temperature in the separator can be varied from 500° F. to 800° F., preferably about 600° F., at atmospheric pressure and controlled to assure that essentially all of the oil shale dust gravitates to and is entrained in the solids bottom oil fraction. Dust-laden heavy oil has an API gravity from 5° to 20° and a mean average boiling point from 600° F. to 950° F.

The dusty shale oil in line 27 is dedusted in one or more dedusters (solids-liquid separators) 28, such as desalters, centrifuges, and/or dryers, and otherwise processed as described in U.S. Pat. Nos. 4,404,085; 4,415,430; and 4,415,434; which are hereby expressly incorporated by reference. Other types of dedusters can also be used.

In the deduster 28, the dusty shale oil is dedusted into a dedusted stream of shale oil and a dust-laden residual stream of sludge. The dedusted shale oil exits the deduster through dedusted oil line 30. The sludge exits the deduster through sludge line 32.

In order to upgrade the dedusted oil into a more marketable product, the dedusted oil in dedusted oil line 30 is fed to one or more upgrading reactors 34, such as a hydrotreater, hydrocracker, or catalytic cracker. The reactor can be an ebullated bed reactor, fluid bed reactor, or fixed bed reactor. Hydrogen or hydrogen rich gases are injected into the reactor through injection line 36. An upgrading catalyst is fed to the reactor through catalyst line 38.

In the upgrading reactor, the dedusted shale oil is contacted with the upgrading gas in the presence of the upgrading catalyst, to remove various contaminants contained in the shale oil, such as nitrogen, sulfur, oxygen, and trace metals, such as arsenic, iron, vanadium, and nickel. The upgraded shale oil product or syncrude is removed from the reactor through product line 40. Reactor offgases are withdrawn from the reactor through gas line 42. Spent catalyst is discharged from the reactor through spent catalyst line 44.

The catalyst has at least one hydrogenating component, such as cobalt, molybdenum, nickel, or phosphorus, or combinations thereof, on a suitable support, such as alumina, silica, zeolites, and/or molecular sieves having a sufficient pore size to trap the trace metals from the shale oil. Other upgrading catalysts can be used.

Typical upgrading conditions in the reactor are: total pressure from 500 psia to 6,000 psia, preferably from 1,200 psia to 3,000 psia; hydrogen partial pressure from 500 psia to 3,000 psia, preferably from 1,000 psia to 2,000 psia; upgrading gas flow rate (gas feed rate) from 2,500 SCFB to 10,000 SCFB, and LHSV (liquid hourly space velocity) from 0.2 to 4, and preferably no greater than 2, volumes of oil per hour per volume of catalyst. Hydrotreating temperatures range from 700° F. to 830° F. Hydrocracking temperatures range from 650° F. to 820° F.

Retorted and spent oil shale from the retort 12 are discharged through the bottom of the retort and are fed by gravity flow or other conveying means through combustor feed line 46 to the bottom portion of an external dilute phase, vertical lift pipe combustor. The lift pipe 48 is spaced away and positioned remote from the retort. Shale dust removed from the product stream in cyclone 18 can also be conveyed by gravity flow or other conveying means through a dust outlet line 50 to the bottom portion of the combustor lift pipe. Sludge from the deduster can also be fed from the sludge line 32 to the bottom of the lift pipe combustor, either directly or after being dried in a dryer.

In the lift pipe combustor 48, the retorted shale, sludge, dust, and heat carrier materials are fluidized, entrained, propelled, and conveyed upwardly into an overhead collection and separation bin 52 by air injected into the bottom portion of the lift pipe through air injection nozzle 54. Shale oil and any carbon residue in the sludge are substantially completely combusted in the lift pipe along with residual carbon on the retorted shale and shale dust. The residual oil in the sludge provides auxiliary fuel for the lift pipe combustor. Light hydrocarbon gases or shale oil can also be fed to the lift pipe to augment the fuel. The combustion temperature in the lift pipe and overhead vessel is from 1,000° F. to 1,400° F. The combusted spent sludge, combusted oil shale, and combusted spent shale dust are discharged through an outlet in the bottom of the overhead bin into heat carrier feed line 14 for use as solid heat carrier material in the retort.

The carbon contained in the retorted oil shale and sludge are burnt off mainly as carbon dioxide during combustion in the lift pipe and overhead bin. The carbon dioxide along with the air and other products of combustion form combustion offgases or flue gases which are withdrawn from the upper portion of the overhead bin through a combustion gas line 55. The combustion gases are dedusted in an external cyclone or an electrostatic precipitator before being discharged into the atmosphere or processed further to recover steam.

While an external dilute phase lift pipe combustor is preferred for best results, in some circumstances it may be desirable to use other types of combustors, such as a horizontal combustor, a fluid bed combustor, or an internal dilute phase lift pipe which extends vertically through a portion of the retort. If ceramic and/or metal balls are used as the solid heat carrier material, such as for rotating pyrolysis drum retorts, the retorting system should have a ball separator, such as a rotating trommel screen and a ball heater in lieu of or in combination with the combustor.

Residual waste material (tailings) comprising excess spent (combusted) shale, dust, and sludge are withdrawn from the overhead bin 52 and retort system through discharge line 56 and fed by gravity flow or other conveying means to a heat recovery system or unit 58. The tailings in the heat recovery system or unit are sprayed with water through nozzles 60 to moisturize and agglomerate the dusty tailings for easier handling and transport, as well as to generate steam and recover heat from the tailings. Steam is withdrawn from the heat recovery unit through steam line 62 and recycled for use elsewhere in the retorting system or fed to steam turbines, generators, boilers, etc. In the preferred embodiment, oil shale retort water from retort water line 24 is sprayed into the heat recovery unit through nozzles 60 to moisturize the spent shale. This avoids the enormous expense of purifying and treating the contaminated retort water to environmentally acceptable levels and thereby substantially enhances retorting efficiency and economy.

Spent catalyst in line 44 can be combusted and regenerated in a combustor. Excess spent catalyst can be fed to the heat recovery unit 58 and cooled with a water spray to generate steam and recover heat from the spent catalyst. Moisturization and cooling of the spent catalyst in the heat recovery unit can take place simultaneously with or separately from the moisturization and cooling of the spent shale and dust, as desired.

The moisturized, agglomerated tailings are discharged from the heat recovery unit through discharge line 64, where they are transported to a disposal site 66. Moisturized or non-moisturized spent catalyst can also be fed to the disposal site as part of the tailings, as can excess non-combusted retorted shale. Retorted shale from retorts which do not use combusted shale as the heat carrier material can further be fed to the disposal site as part of the tailings, as well as residual material from the extraction or processing of other synfuels.

The disposal site 66 is preferably built above ground 68 on a tract of property which is easily accessible and not too far from the retorting area in order to minimize transportation and handling costs. Such tracts of property can be located above an underground stream or aquifer 70, or near an aboveground body (source) of water, such as a pond, lake, stream, or river.

Oil shale retort water is formed from the thermal decomposition of kerogen during retorting and is referred to as "water of formation." Oil shale retort water can also be derived from steam injection (process water). Raw retort oil shale water, if left untreated, is generally unsuitable for safe discharge into lakes and rivers or for use in downstream shale oil processes, because it contains a variety of suspended and dissolved pollutants, impurities, and contaminants, such as raw, retorted and spent oil shale particulates, shale oil, grease, ammonia, phenols, sulfur, cyanide, lead, mercury, and arsenic. Oil shale water is much more difficult to process and purify than waste water from natural petroleum refineries, chemical plants, and sewage treatment plants, because oil shale water generally contains a much greater concentration of suspended and dissolved pollutants which are only partially biodegradable. For example, untreated retort water contains over 10 times the amount of total organic carbon and chemical oxygen demand, over 5 times the amount of phenol, and over 200 times the amount of ammonia as waste water from natural petroleum refineries.

Oil shale retort water is laden with suspended and dissolved impurities including shale oil and particulates of raw, retorted, and/or spent oil shale ranging in size from less than 1 micron to 1,000 microns as well as a variety of other impurities as explained below. The amount and proportion of the shale oil, oil shale particulates, and other impurities in the retort water depend upon the richness and composition of the oil shale being retorted, the type of heat carrier being used, and the retorting conditions.

Test samples of oil shale retort water from a screw conveyor surface retort had the following composition (in mg/l except where noted):

|  | Test 1 | Test 2 | Test 3 | Test 4 | Test 5 |
|---|---|---|---|---|---|
| SOC (soluble organic carbon) | 2,880 | 3,475 | 2,730 | 3,150 | 3,000 |
| TOC (total organic carbon) | 2,690 | 3,475 | 2,620 | 3,000 | 2,850 |
| SIC (soluble inorganic carbon: carbonates) | 6,095 | 5,745 | 4,260 | 4,640 | 5,970 |
| TIC (total inorganic carbon) | 6,230 | 6,045 | 4,300 | 5,225 | 6,325 |
| COD (chemical oxygen demand) | 11,093 | 11,906 | 10,019 | 11,413 | 10,648 |
| TDS (total dissolved solids) | 901 | 886 | 889 | 970 | 724 |
| $CN^-$ | 0.85 | 1.25 | 1.15 | 2.42 | 1.4 |
| Phenol | 66 | 74 | 87 | 69 | 69 |
| $NH_3-N$ | 4,000–5,000 | 4,000–5,000 | 4,000–5,000 | 4,000–5,000 | 4,000–5,000 |
| $S^=$ | 2.7 | 3.1 | 2.7 | 0.8 | 8.7 |
| TKN (% total kjeldahl nitrogen) | 0.619 | 0.618 | 0.420 | 0.464 | 0.604 |
| Total P | 1 | 1 | <1 | 1 | <1 |
| F | 0.6 | 0.6 | <0.1 | 0.5 | 0.6 |
| As | 0.3 | 0.4 | 0.3 | 0.3 | 0.4 |
| Se | 0.85 | 2.66 | 0.86 | 0.72 | 0.74 |
| Ba | 3.0 | 0.7 | 0.2 | 0.1 | 0.1 |
| Pb | <0.2 | <0.2 | <0.2 | <0.2 | <0.2 |
| Hg (ppb) | 0.5 | 1.0 | 0.8 | 0.7 | 1.3 |

Note: All values mg/l except Hg-ppb, TKN-%.

A test sample of combusted oil shale which was retorted in a screw conveyor surface retort and combusted in a dilute phase lift pipe had the following composition:

| Test 6 | |
|---|---|
| Silicon dioxide | 46.00% by weight |
| Iron oxides | 4.40% by weight |
| Aluminum oxide | 12.70% by weight |
| Calcium oxide | 22.40% by weight |
| Magnesium oxide | 4.80% by weight |
| Sulfate | 3.80% by weight |
| Sodium oxide | 3.20% by weight |
| Potassium oxide | 2.70% by weight |
| Carbonate | 4.40% by weight |
| Chloride | 0.08% by weight |

A test sample of moisturized combusted oil shale which was retorted in a screw conveyor surface retort, combusted in a dilute phase lift pipe, and sprayed (moisturized) with about 23% by weight water (on a dry shale basis) had the following composition and flow rate:

| Component | Test 7 Weight Percent | Mass Flow, $10^3$ lb/hr |
|---|---|---|
| Retorted shale (moisturized) | 100.00 | 9,733 |
| Moisture | 18.70 | 1,820 |
| Oxygen (organic) | 0.02 | 2 |
| Nitrogen (organic) | 0.08 | 8 |
| Carbon (organic) | 0.25 | 24 |
| Sulfur (total) | 0.93 | 91 |

One test sample of leachate of combusted oil shale which was retorted in a screw conveyor surface retort and combusted in a dilute phase lift pipe had the following impurities:

| Test 8 | |
|---|---|
| Silicon dioxide | 18 mg/l |
| Iron oxides | <0.01 mg/l |
| Aluminum oxide | <0.1 mg/l |
| Calcium oxide | 1,080 mg/l |
| Magnesium oxide | 102 mg/l |
| Sodium oxide | 337 mg/l |
| Potassium carbonate | 37 mg/l |
| Carbonate | 90 mg/l |
| Chloride | 28 mg/l |
| Sulfate | 1,810 mg/l |
| Hydroxide | 222 mg/l |
| Total dissolved solids | 3,530 mg/l |
| pH = 11.4 | |

Another more comprehensive test sample of leachate of combusted oil shale which was retorted in a screw conveyor retort, combusted in a dilute phase lift pipe, and slurried with distilled water had substantial quantities of sodium, calcium sulfates, and other impurities as follows:

| Test 9 | |
|---|---|
| pH | 9.6 |
| Dissolved oxygen | 8.5 mg/l |
| Total N | 9.3 mg/l |
| $NH_3-N$ | 4.3 mg/l |
| Total dissolved solids | 3,945 mg/l |
| Cyanide | 0.1 mg/l |
| Boron | 0.04 mg/l |
| Silica | 1.7 mg/l |
| Hydroxide alkalinity | 44 mg/l as $CaCO_3$ |
| Carbonate alkalinity | 64 mg/l as $CaCO_3$ |
| Conductivity | 4,100 umhos/cm |
| TOC (total organic carbon) | 3.5 mg/l |
| Phenols | <0.01 mg/l |
| Sulfite | 100 mg/l |
| Sulfide | <0.2 mg/l |
| Chloride | 23 mg/l |
| Total phosphorus | <1 mg/l |
| $PO_4-P$ | <1 mg/l |
| Hg | <0.0002 mg/l |
| Be | 0.08 mg/l |
| Mg | 0.58 mg/l |
| Ca | 810 mg/l |
| Na | 350 mg/l |
| Cr | <0.05 mg/l |
| Ba | 4.7 mg/l |
| Co | 0.06 mg/l |
| Al | 1.0 mg/l |
| Cu | <0.05 mg/l |
| Ni | 0.1 mg/l |
| Pb | <0.5 mg/l |
| Fe | <0.05 mg/l |
| Li | 2.5 mg/l |
| Cd | <0.04 mg/l |
| Mo | 7.0 mg/l |
| Ag | <0.05 mg/l |

-continued

| Test 9 | |
|---|---|
| Ti | 0.5 mg/l |
| Sr | 19 mg/l |
| V | <0.2 mg/l |
| Sn | <10 mg/l |
| K | 49 mg/l |
| As | 0.01 mg/l |
| Se | 0.03 mg/l |
| Fluoride | 4 mg/l |
| Nitrate | <1 mg/l |
| Sulfate | 2,100 mg/l |

Pore volume of leachate of another tested sample of combusted oil shale retorted in a screw conveyor surface retort and combusted in a dilute phase lift pipe had the following analysis:

| Test 10 | |
|---|---|
| Pore Volume | |
| ml Through Column | 650 |
| pH | 12.0 mg/l |
| $SO_4^=$ | 4,240 mg/l |
| TOC (total organic carbon) | 22 mg/l |
| IC (inorganic carbon) | 4 mg/l |
| BOC (biochemical oxygen demand) | <20 mg/l |
| Total alkalinity | 1,088 mg/l |
| $OH^-$ Alk | 824 mg/l |
| $CO_3^=$ Alk | 264 mg/l |
| $Cl^{-3}$ | 250 mg/l |
| Total N, ppm | <50 mg/l |
| F | 18 mg/l |
| B | 0.2 mg/l |
| Copper | <0.01 mg/l |
| Sodium | 1,200 mg/l |
| Lithium | 30 mg/l |
| Magnesium | <0.1 mg/l |
| Calcium | 520 mg/l |
| Potassium | 510 mg/l |
| Nickel | 0.2 mg/l |
| Iron | 0.06 mg/l |
| Zinc | <0.1 mg/l |
| Chromium | 0.2 mg/l |
| Cadmium | <0.01 mg/l |
| Antimony | <0.02 mg/l |
| Silver | <0.005 mg/l |
| Manganese | <0.02 mg/l |
| Barium | 0.4 mg/l |
| Molybdenum | 13 mg/l |
| Aluminum | <0.5 mg/l |
| Beryllium | <0.005 mg/l |
| Selenium | 0.08 mg/l |
| Arsenic | <0.01 mg/l |
| Strontium | 27 mg/l |
| Thallium | <0.01 mg/l |
| Vanadium | <0.5 mg/l |
| Silicon | 7.1 mg/l |
| Lead | <0.01 mg/l |
| Uranium | <1 mg/l |

A sample of retorted (non-combusted) oil shale which was retorted in a rotating pyrolysis drum, surface retort with ceramic or metal balls as the heat carrier material contained the following compounds and trace elements:

| Test 11 | |
|---|---|
| Compounds | Weight (%) |
| $SO_3$ | 2.63 |
| Total C | 9.82 |
| Inorganic C | 4.41 |
| Organic C | 5.41 |
| $SiO_2$ | 33.07 |
| $Al_2O_3$ | 9.14 |
| $Fe_2O_3$ | 3.24 |

-continued

| Test 11 | |
|---|---|
| CaO | 17.56 |
| MgO | 7.74 |
| $Na_2O$ | 0.77 |
| $K_2O$ | 1.39 |
| Trace Elements | Weight (ppm) |
| Be | 1.0 |
| Hg | 0.04 |
| Cd | 0.5 |
| Sb | 0.5 |
| Se | 0.3 |
| Mo | 10.0 |
| Co | 16.0 |
| Ni | 38.0 |
| Pb | 34.0 |
| As | 25.0 |
| Cr | 100.0 |
| Cu | 26.0 |
| Zr | 43.0 |
| B | 100.0 |
| Zn | 35.0 |
| V | 80.0 |
| Mn | 250.0 |
| F | 900.0 |

Another sample of retorted (non-combusted) oil shale which was retorted in a rotating pyrolysis drum, surface retort with ceramic or metal balls as the heat carrier material had the following composition:

| Hydrogen (organic) | 0.44% by weight |
|---|---|
| Nitrogen (organic) | 0.35% by weight |
| Carbon (organic) | 4.49% by weight |
| Sulfur (total) | 0.76% by weight |
| $Na_2O$ | 8.68% by weight |
| $K_2O$ | 3.28% by weight |
| CaO | 15.80% by weight |
| MgO | 5.31% by weight |
| $Al_2O_3$ | 6.80% by weight |
| $SiO_2$ | 33.00% by weight |
| $Fe_2O_3$ | 2.52% by weight |
| $CO_2$ | 20.92% by weight |

Test samples of the total organic carbon (TOC) of leachable organics from retorted (non-combusted) oil shale, processed in a rotating pyrolysis drum, surface retort were as follows:

| | Volume of Water Added (ml) | Volume of Water Recovered (ml) | TOC (mg/l) | TOC (mg) |
|---|---|---|---|---|
| Test 12 | 250 | 165 | 176 | 29 |
| Test 13 | 250 | 215 | 94 | 20 |
| Test 14 | 250 | 240 | 52 | 12.5 |
| Test 15 | 250 | 250 | 40 | 10 |
| Test 16 | 250 | 245 | 30 | 7.4 |

Test samples of soluble salts in leachates of retorted (non-combusted) oil shale processed in a rotating pyrolysis drum, surface retort had the following concentration:

| Test | Volume of Leachate Sample (cc) | Total Volume of Leachate (cc) | Concentration (mg/l) of Sample | | | | |
|---|---|---|---|---|---|---|---|
| | | | Na+ | Ca++ | Mg++ | SO4= | Cl− |
| 17 | 254 | 254 | 35,200 | 3,150 | 4,720 | 90,000 | 3,080 |
| 18 | 340 | 594 | 26,700 | 2,145 | 3,725 | 70,000 | 1,900 |
| 19 | 316 | 910 | 14,900 | 1,560 | 2,650 | 42,500 | 913 |
| 20 | 150 | 1,060 | 6,900 | 900 | 1,450 | 21,500 | 370 |
| 21 | 260 | 1,320 | 2,530 | 560 | 500 | 8,200 | 250 |
| 22 | 125 | 1,445 | 1,210 | 569 | 579 | 5,900 | 138 |
| 23 | 155 | 1,600 | 735 | 585 | 468 | 4,520 | 138 |
| 24 | 250 | 1,850 | 502 | 609 | 536 | 4,450 | 80 |

A typical sample of trace metals and elements in leachate of retorted (non-combusted) oil shale processed in a rotating pyrolysis drum, surface retort, caused by runoff from a rainstorm in Colorado was as follows:

| | Test 25 |
|---|---|
| Trace Metal or Element | Runoff From Typical Rainstorms (parts per billion) |
| Hg | 2-7 |
| Se | 4-7 |
| Mo | 30-90 |
| Co | 10 |
| Ni | 50 |
| Pb | 9 |
| As | 5-8 |
| Cr | 10-70 |
| Cu | 20 |
| Zr | 1 |
| Zn | 10-90 |
| Li | 20-200 |
| V | 3 |
| Mn | 4 |
| F | 20-300 |
| Ba | 20-40 |
| Fe | 90-60 |

In order to form the disposal site, porous rocky overburden from areas adjacent the oil shale site are dug up by mining and/or road grading equipment, such as bulldozers, and transported by trucks to the disposal area. At the disposal area, the porous rocky overburden is laid, placed, and stacked upon the ground to form a permeable base or porous base layer 72 (FIGS. 1 and 2). The base provides a ventilated foundation to cause vapor transport of seepage from the pile into the atmosphere. The base is preferably of a generally uniform thickness and has a generally level and horizontal top surface.

After the base is formed, the base is covered with a pile of tailings 74 (waste material). In the preferred embodiment, the tailings include moisturized, combusted oil shale, shale dust, and spent catalyst from line 64. The pile of tailings can extend to the top of the disposal site. Conventional construction and road grading equipment can be used for moving and handling the tailings.

Preferably, after the tailings have reached a predetermined height, the tailings are covered with another permeable layer or seam 76 of porous rocky overburden. These steps are repeated to form one or more additional permeable layers or seams 78 of porous rocky overburden. In the preferred embodiment, the porous seams or layers extend horizontally and laterally across the pile of tailings and are each of the same uniform thickness or depth as the base. While the described disposal site is preferred for best results, in some circumstances it may be desirable to have intermediate and upper layers (seams) of different depths, or uneven depths (nonuniform) layers, or no layers. Furthermore, if desired, the base and/or seams can slope at an angle of inclination.

The base can have a depth ranging from 1 to 1000 feet, preferably 10 to 100 feet. Each of the intermediate and upper seams can have a depth ranging from 1 to 500 feet, preferably 10 to 50 feet. The spacing, interval, and depth between adjacent seams can range from 10 to 1000 feet, preferably from 10 to 100 feet. The overall height of the disposal site can range from 10 to 3000 feet, preferably from 100 to 1000 feet. The sides 80 of the pile are contiguous and are at an angle of inclination relative to the ground ranging from 10° to 75°, preferably from 30° to 60°.

The top 82 of the pile can be generally planar or flat and can have a roadway thereon to support vehicular traffic. If desired, the top of the pile can be graded at an angle of inclination, or can be rounded or humped, to enhance water runoff and drainage.

The disposal site can also have one or more vertical permeable chimneys 84 and 86 extending upwardly from the base 72 to the top 82 of the pile. The chimneys are preferably formed of porous rocky overburden. The rocks in the chimney can be placed in an upright tubular casing or conduit 88 as shown in FIG. 2, or can be stacked in a generally upright frustro-conical or pyramid-shaped pile 90 as shown in FIG. 4. For economy of material, the casing can be made of a cementatious spent shale slurry. The conduit can also be made of reinforced concrete, metal, or plastic. If desired, the horizontal rocky seams and base can also be placed in horizontal casings. While the described disposal site is preferred for best results, in some circumstances it may be desirable to use the chimneys in lieu of the rocky layers.

A pipeline can also extend through the pile to further increase the circulation of air through the pile. The pipeline is preferably used in conjunction with the rocky layers and chimneys, although in some circumstances it may be desirable to use the pipeline in lieu of the rocky layers or chimneys. The pipeline is made of metal, concrete, or plastic perforated pipes, conduits, or foraminous tubing, such as polypropylene tubing. In the embodiment of FIG. 4, the pipeline includes pipes 92, 94, 96, and 98. Pipes 92, 94, and 96 are laid midway across the rocky seams 72, 74, and 76, respectively, i.e., along the horizontal centerlines of the seams, as the seams are being constructed. Similarly, vertical pipes 98 are erected upwardly through each chimney along its vertical centerline. The pipes, as well as the casings, have air holes, slots, or passageways in their annular walls for passage of air into the tailings and for ingress of water vapors from the tailings into the pipes and casings. While the arrangement of pipes shown in FIG. 4 is preferred for maximum effectiveness, in some circumstances it may be desirable to position the pipes at an angle of inclination and/or in offset relationship to and away from the centerlines of the rocky layers or chimneys.

The porous seams (rocky layers) and chimneys, as well as the pipes and casings, extend through the pile of tailings and have air flow passageways therethrough for circulation and passage of air into the tailings to evaporate the moisture contained in the tailings. The rocky layers and chimneys, as well as the pipes and casings, each provide pneumatic vapor enhancing means or vapor enhancers, which also serve as vapor breaks or vapor barriers, to pneumatically evaporate most, if not all, of the moisture reaching and approaching it, as wind or natural air currents circulate through the vapor enhancers. The passageways and the vapor breaks also serve to collect, pass, and transport vaporized moisture through the top and sides of the pile for discharge into the atmosphere as explained more fully below.

Circulation of ambient air through the vapor barriers can be enhanced with one or more air blowers 102 (FIG. 3) and/or centrifugal fans 104. The blowers and fans can be powered by steam or electricity generated in the retorting system or by other sources. Air pumps, compressors, and other types of fans can also be used. Preferably, dry air or air having a relatively low humidity is circulated through the pile of tailings via the vapor breaks to enhance evaporation of the moisture in the pile. Most preferably, the air should have a moisture content below that of the processed shale. The difference in the high humidity within the pile and the low humidity outside the pile will result in more leachate evaporating rather than flowing downward out of the pile into the groundwater. The flow rate of the air should be sufficient to evaporate and exhaust all the water in the disposal site.

In order to prevent plugging or silting of the vapor barriers, a filter 106 (FIG. 2) can be placed upon the rocky base 72 immediately after the base has been constructed. The filter preferably covers the entire top surface of the base except where the base intersects and communicates with the chimneys. Filters 108 and 110 can also be placed upon and cover the other rocky seams in a similar manner. The filter can be woven cloth, felted cloth, sand, and/or gravel. Other types of filters can also be used.

In order to minimize erosion and blowing of the tailings, and to enhance the overall appearance and aesthetic appeal of the disposal site, the top 82 and sides 80 of the pile are covered with top soil 112 and vegetation, such as trees 114, shrubbery 116, and grass 118. The top soil and vegetation, however, should not cover or block the inlets (entrances) or outlets (exits) at the ends of the seams, chimneys, and pipes, in order to assure the uninterrupted flow of air through the vapor enhancers.

In use, water in the pile of waste material gravitates downwardly over time through the pile. Some of the water is attributable to the inherent moisture in the waste material, as well as the moisture which was sprayed on the tailings in the heat recovery unit. Water in the pilings can also be attributable to rainfall or melting snow. As the water approaches or reaches the vapor barriers (rocky layers, chimneys, pipes, etc.), the air circulated through the passageways of the vapor barriers will circulate through the tailings and evaporate the moisture. The partially saturated air carrying the evaporated moisture will flow through the air flow passageways in the vapor barriers and be carried upwardly out of the chimneys or out of the side exits of the seams and pipes for discharge into the atmosphere. Because the base supports and elevates the pile of waste material above the ground and because the vapor barriers collectively serve to eventually evaporate all the moisture contained within the pile of waste material, none of the moisture contained in the pile will percolate and leach through the base of the disposal site into the ground.

Since all the water in the pile is evaporated in the vapor phase, none of the water will serve as a carrier or leachate to carry contaminants in the waste material into the ground and pollute underground bodies of water (aquifers, streams, etc.) and nearby lakes, ponds, streams, and rivers.

The flow rate, drainage, and seepage of water through the pile of shale tailings is determined in part by the chemical composition, temperature, physical characteristics, and size of the processed shale. Other factors effecting the flow rate of water in the pile are: the extent of moisturization of the shale, the density and relative porosity of the tailings, and the magnitude of the compressive forces and internal pressure within the interior of the pile.

After the processed shale is deposited in the pile in the disposal site, various physical and chemical reactions can take place, such as cooling, chemical reactions, settlement, infiltration, seepage, condensation, and vaporization. For example, the pile of spent shale will cool over a long period of time until the pile finally reaches a thermal equilibrium with the surrounding environment. Process shale also contains significant quantities of pozzolanic materials which react in the presence of water to cause some cementation of the spent shale pile. These reactions are exothermic and contribute to sustaining the elevated temperature of the upper portion of the pile. They also cause portions of the pile to develop considerable mechanical strength due to the cementation process which accompanies these chemical reactions. These reactions also chemically fix water in the pile and help reduce the amount of water available for leachate generation.

As the process shale is deposited in the pile, it undergoes settlement due to self-load of the pile. The settlement continues after the pile is complete and causes a reduction in porosity and permeability of the pile. As precipitation and other moisture falls on the surface of the pile, some of the moisture infiltrates the body of the pile. This water will tend to move downwardly, joining moisture already placed in the pile during the moisturization process. This moisture has a tendency to dissolve and transport salts, hydrocarbons, and various contaminants within the pile, until the moisture is evaporated by the vapor breaks. Water gravitating downwardly in the pile will generally be insufficient to saturate the waste matrix (pile). As a result, there will be a gaseous atmosphere in the pile in which water vapor will generally be in thermodynamic equilibrium with the liquid phase water. Vaporization and condensation will occur to maintain this balance.

Long term generation and flow of leachate in a process shale pile occurs in the: (1) infiltration zone or near surface active zone at the top of the pile, (2) the interior flow zone (steady state zone) in the interior of the pile, and (3) the discharge, exit, or base zone at the bottom of the pile.

In the infiltration zone or near surface active zone, the water content is highly variable and the processes of infiltration, evapotranspiration, evaporation, and deep seepage take place. The infiltration zone is the portion of the pile where the partitioning of the incident precipitation occurs. Evaporation and transpiration absorb the majority of the incident precipitation, with a small portion escaping these processes and entering the deep flow system.

The interior flow zone or steady state zone is not generally affected by short term changes at the surface.

The only variation which takes place in the steady state zone is the gradual transition of flow from drainage of the original moisture to seepage of water infiltrating from the surface. The flow regime in the interior flow zone is divided into two regions. The lower region has flow that represents movement of moisture that was emplaced in the pile. This region thus reduces in size with time, as the moisture moves out of the base of the zone. Flow in the upper region of the zone results from infiltrated water, and is in general taking place at a different rate than in the lower region. The interface between these two flow regions moves downward, at a rate that depends on the properties of the pile materials, the infiltration rate, and the initial processed shale moisture content.

The exit or base zone is the lower portion of the pile, where water would otherwise exit from the pile, if it were not evaporated by the vapor breaks of the present invention. Significant downward vapor flow can take place in the base zone without the presence of the vapor breaks.

Water enters the top of the pile in the active zone. The majority of the water entering the pile is evaporated and transpires from the active zone. Salts in the active zone are concentrated at the base of the active zone and are moved into the deep seepage steady state zone by infiltrating water. The flow of water in the steady state zone depends to some extent on whether the water flowing into the steady state zone is primarily moisturizing water or infiltrated water. Typically, the first water to enter the steady state zone is moisturizing water. Moisturizing water will be in chemical equilibrium with the waste material in the pile and will be saturated with salts as well as other contaminants. Some of the highly saline water moves downwardly toward the base zone.

After a long period of time, such as between 10 and 500 years for a 100-meter pile under normal conditions, the first portion of the infiltrated water will approach the base zone. A gradually decrease in the saline content or the water approaching the base zone will occur as the upper portion of the pile will be progressively leached by rain or melting snow. The reduction in salinity, however, is expected to take over a 1,000 years.

As air is circulated through the porous base, the water approaching the base will vaporize, leaving all or part of the salts and other contaminants on top of the base zone. At this location, a caliche layer may form and agglomerate a portion of the pore space and reduce some of the hydraulic conductivity of the base zone. As a result, the hydraulic conductivity can drop low enough that seepage toward the base zone will be significantly reduced and the lower part of the tailings will begin to saturate. Movement of moisture (water) out of the pile through the vapor enhancers by vapor transport would continue because of the rapid circulation of air through the vapor enhancers and because this mode of transport depends more on the porosity of the pile than on saturated liquid flow. The escape of pollutants from the pile is avoided by causing the water flux to pass out of the pile in the vapor phase through the vapor enhancers in accordance with the present invention. This can be enhanced by keeping the atmosphere in the base at a relatively low humidity, as well as by the described arrangement of rocky layers and/or pipes (drains) both beneath and within the pile which encourage heat-powered convection of air. This process and system rapidly conducts the water vapor to the atmosphere leaving the foundation (base) dry enough to cause vapor flow in the bottom portion of the pile.

Advantageously, the process and system of the invention provides an environmentally acceptable disposal site with built-in protective mechanisms (vapor breaks) against leachate escape from the tailings. Disposal sites constructed and arranged in accordance with the novel process prevent contaminated seepage from being released from the waste pile. With this process and system, it is now possible to construct a disposal site for spent shale and other materials that will prevent contaminants from leaching out of the pile into the ground and surrounding bodies of water. This can have far-reaching benefits for the synthetic fuels industry.

Although embodiments of this invention have been shown and described, it is to be understood that various modifications and substitutions, as well as rearrangements and combinations of parts, equipment, and/or process steps can be made by those skilled in the art without departing from the novel spirit and scope of this invention.

What is claimed is:

1. A disposal process, comprising the steps of:
   forming a pile of waste material and pneumatic vapor enhancing means comprising a subterranean chimney extending substantially upwardly through said pile of waste material for providing a substantially unobstructed path for the convective diffusion and bulk flow of water in said pile; and
   circulating air though said pneumatic vapor enhancing means to substantially vaporize water in said pile so as to substantially prevent leaching of contaminants through said pile into groundwater, rivers, lakes, ponds, and streams.

2. A process in accordance with claim 1 wherein said pneumatic vapor enhancing means comprises a generally horizontal, porous base layer of rocks.

3. A process in accordance with claim 1 wherein said pneumatic vapor enhancing means comprises an inclined, porous base layer of rocks.

4. A process in accordance with claim 1 wherein said pneumatic vapor enhancing means comprises a plurality of seams of rocks spaced between said waste material.

5. A process in accordance with claim 1 wherein said chimney comprises at least one generally upright porous column of rocks.

6. A process in accordance with claim 1 wherein said pneumatic vapor enhancing means comprises foraminous tubing.

7. A process in accordance with claim 1 wherein said pneumatic vapor enhancing means comprises an overburden covered with a filter selected from the group consisting of sand, gravel, woven cloth, and felted cloth.

8. A process in accordance with claim 1 wherein said air is circulated by circulation means selected from the group consisting of a blower, pump, compressor, fan, and combinations thereof.

9. A process in accordance with claim 1 wherein said waste material is produced from synthetic fuels selected from the group consisting of oil shale, tar sands, and diatomite.

10. A process in accordance with claim 1 wherein said waste material is produced from ore.

11. A process in accordance with claim 10 wherein said waste material is produced by extraction, retorting, smelting, or froth flotation.

12. A process in accordance with claim 10 including liberating a metal selected from the group consisting of copper, molybdenum, gold, and silver, from said ore to leave said waste material.

13. A process in accordance with claim 10 including liberating a mineral selected from the group consisting of talc, calcium carbonate, clay, and chlorite, from said ore to leave said waste material.

14. A process in accordance with claim 10 wherein said waste material comprises spent catalyst.

15. A syncrude producing and disposal process, comprising the steps of:
   (a) liberating oil in an aboveground retort from raw synthetic fuels selected from the group consisting of oil shale, tar sands, and diatomite, leaving tailings;
   (b) upgrading said oil to produce syncrude;
   (c) laying a permeable base of rocks upon the ground and an upwardly extending pile of rocks forming a chimney upon said base to provide a vapor break;
   (d) piling said tailings upon said permeable base and about said chimney; and
   (e) evaporating moisture in said pile by passing air through said permeable base and chimney to substantially prevent said moisture and tailings from leaching into and polluting nearby natural bodies of water.

16. A process in accordance with claim 15 wherein said moisture is selected from the group consisting of retort water, moisturizing water, rainfall, and snow meltage.

17. A process in accordance with claim 15 wherein said oil is liberated by retorting said synthetic fuels with heat carrier material.

18. A process in accordance with claim 17 wherein said heat carrier material comprises solid heat carrier material selected from the group consisting essentially of combusted synthetic fuels, sand, ceramic balls, and metal balls.

19. A process in accordance with claim 17 wherein said heat carrier material comprises a gaseous heat carrier medium.

20. A process in accordance with claim 15 wherein said tailings comprise retorted synthetic fuels.

21. A process in accordance with claim 15 wherein said tailings comprise substantially combusted synthetic fuels.

22. A process in accordance with claim 15 wherein said upgrading comprises contacting said oil with an upgrading gas in the presence of a catalyst in at least one reactor under upgrading conditions removing spent catalyst from said reactor, and piling said spent catalyst upon said permeable base as part of said tailings.

23. A retorting and disposal process, comprising the steps of:
   (a) heating raw oil shale by contacting said raw oil shale with combusted oil shale at a sufficient temperature in a surface retort selected from the group consisting of a screw conveyor retort with a surge bin, a rotating pyrolysis drum retort with an accumulator, a fluid bed retort, a static mixer retort with a surge bin, and a gravity flow retort, to liberate an effluent product stream containing particulates of oil shale dust ranging in size from less than 1 micron to 1,000 microns leaving retorted shale;
   (b) partially dedusting said effluent product stream in at least one gas-solids separator selected from the group consisting of a cyclone and a filter;
   (c) separating fractions of gases, retort water, and shale oil containing from 1% to 65% by weight of said oil shale dust in at least one separator selected from the group consisting essentially of a fractionator, scrubber, and quench tower;
   (d) substantially dedusting said fraction of shale oil;
   (e) combusting said retorted shale in a combustor selected from the group consisting of a lift pipe combustor, a horizontal combustor, and a fluid bed combustor, to form combusted oil shale for use in step (a);
   (f) cooling excess combusted shale in a cooler by spraying water on said combusted shale to moisturize and agglomerate said combusted shale while simultaneously generating steam and recovering heat from said combusted shale;
   (g) forming an environmentally acceptable disposal site by
      placing a porous rocky overburden upon the ground to form a permeable base,
      erecting at least one permeable chimney extending substantially upwardly from said permeable base,
      transporting said agglomerated combusted shale and dust to said disposal site,
      covering said permeable base and the sides of said chimney with a pile of said agglomerated combusted shale and dust, said pile extending to about the top of said chimney,
      said pile cooperating with said base and said chimney to define air flow passageways extending therethrough, said air flow passageways including said permeable base and said chimney,
      substantially covering the top of said pile with top soil, and
      vegetating said top soil; and
   (h) substantially preventing moisture contained in said disposal site from leaching into the ground and contaminating underground aquifers by circulating air having a relative low humidity through said air flow passageways to evaporate and discharge said moisture through said passageways into the atmosphere.

24. A process in accordance with claim 23 wherein said environmentally acceptable disposal site is further formed by laying a pipeline substantially through said permeable base, said pipeline defining air holes and providing part of said air flow passageways.

25. A process in accordance with claim 23 wherein said environmentally acceptable disposal site is further formed by placing a pipeline generally upwardly and substantially through said chimney, said pipeline defining air holes and providing part of said air flow passageways.

26. A process in accordance with claim 23 wherein said environmentally acceptable disposal site is further formed by laying permeable seams of porous rocky overburden generally laterally through said pile, and covering said seams with said agglomerated combusted shale and dust, said seams providing part of said air flow passageways.

27. A process in accordance with claim 26 wherein said environmentally acceptable disposal site is further formed by laying a pipeline laterally across and substantially through said seams, said pipeline defining radial openings and providing part of said air flow passageways.

28. A process in accordance with claim 23 wherein said environmentally acceptable disposal site is further formed by laying a filter selected from the group consisting essentially of gravel, sand, woven cloth, and felted cloth, upon said permeable base.

29. A process in accordance with claim 24 wherein said low humidity air is forceably circulated through said air flow passageways by forced air means selected from the group consisting of a blower, pump, compressor, fan, and combinations thereof.

30. A process in accordance with claim 23 wherein said water in step (f) and said moisture in step (h) comprise retort water.

31. A process in accordance with claim 23 including upgrading said dedusted shale oil with an upgrading gas in the presence of a catalyst in a reactor selected from the group consisting of a hydrocracker hydrotreater, and catalytic cracker, under upgrading conditions, removing spent catalyst from said reactor, and transporting excess spent catalyst to said disposal site as part of said pile.

32. A process in accordance with claim 31 wherein said excess spent catalyst is cooled in said cooler with said water spray to generate steam and recover heat from said spent catalyst.

* * * * *

UNITED STATES PATENT OFFICE
CERTIFICATE OF CORRECTION

Patent No. 4,529,497          Dated    July 16, 1985

Inventor(s) George H. Watson, David B. McWhorter, Adrian Brown

It is certified that error appears in the above-identified patent and that said Letters Patent are hereby corrected as shown below:

Front Page, Item 73 reads "Standard Oil Company (Indiana), Chicago, Ill." and should read --Standard Oil Company (Indiana), Chicago, Illinois and Gulf Oil Corporation, Pittsburgh, Pennsylvania--

| Patent Column | Line | |
|---|---|---|
| 19 | 51 | reads "conditions removing" and should read --conditions, removing-- |
| 17 | 40 | reads "gradually" and should ready --gradual-- |

Signed and Sealed this

Twenty-ninth Day of July 1986

[SEAL]

Attest:

DONALD J. QUIGG

Attesting Officer     Commissioner of Patents and Trademarks